US008978805B2

(12) United States Patent
Tokuda

(10) Patent No.: US 8,978,805 B2
(45) Date of Patent: Mar. 17, 2015

(54) WORKING MACHINE

(71) Applicant: Kubota Corporation, Osaka-shi, Osaka (JP)

(72) Inventor: Takayuki Tokuda, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 13/959,221

(22) Filed: Aug. 5, 2013

(65) Prior Publication Data

US 2014/0034403 A1    Feb. 6, 2014

(30) Foreign Application Priority Data

Aug. 6, 2012    (JP) .................................. 2012-174125

(51) Int. Cl.
*B62D 33/06*    (2006.01)

(52) U.S. Cl.
USPC ...................................................... 180/89.12

(58) Field of Classification Search
USPC ....................... 180/89.12, 89.1, 89.17, 89.18; 296/190.01, 190.08
IPC ....................................................... B62D 33/06
See application file for complete search history.

(56) References Cited

U.S. PATENT DOCUMENTS 7,673,931 B2 *    3/2010    Takano et al. ............ 296/190.01
7,900,730 B2 *    3/2011    Hokimoto .................... 180/89.1

FOREIGN PATENT DOCUMENTS

| JP | 2001-213198 A |   | 8/2001 |         |
|----|---------------|---|--------|---------|
| JP | 2002242236 A  | * | 8/2002 | E02F 9/24 |
| JP | 2012136832 A  | * | 7/2012 |         |

* cited by examiner

*Primary Examiner* — Faye M. Fleming
(74) *Attorney, Agent, or Firm* — Birch, Stewart, Kolasch & Birch, LLP

(57) ABSTRACT

To make it possible to arrange an engine control unit in a narrow arrangement space by, for multiple purposes, using a support member for attaching an operation device. On a machine base supported by a traveling unit, an engine is mounted and a controlling part having an operator's seat is arranged; on one of left and right sides of the controlling part, a vehicle accessory is mounted and covered with an accessory cover; and on a front side of the operator's seat of the controlling part, and near the accessory cover, a support member is provided upright to provide an operation device. Between the accessory cover and the operation device, an engine control unit that controls the engine is arranged, and the engine control unit is attached to the support member.

12 Claims, 21 Drawing Sheets

WORKING MACHINE

TECHNICAL FIELD

The present invention relates to a working machine that is, on a machine base, provided with an engine and an operator's seat.

BACKGROUND ART

In this sort of working machine, on a machine base supported by traveling units, an engine is mounted as well as a controlling part having an operator's seat being arranged; on one of left and right sides of the controlling part, vehicle accessories are mounted, which is covered by an accessory cover; and on a front side of the operator's seat of the controlling part, a display device (operation device) is provided with the accessory cover being provided with a support member upright.

A conventional technique disclosed in Japanese Unexamined Patent Publication JP-A2001-213198 relates to a display device of a construction machine including: a display part that is provided in an operator's cabin of the construction machine having a front working machine and displays positional information of the front working machine; an operation part that switches display content of the display part; and a display control part that controls the display content according to an operation of the operation part, wherein at least the display part of the display part, the operation part, and the display control part is separated from the operation part and the display control part, and configured as an independent unit, and these units are dispersively arranged in different locations within the operator's cabin (claims).

SUMMARY OF INVENTION

Technical Problem

In the conventional technique, the display part is arranged on a front lateral side of an operator's seat, and the operation part and the display control part are arranged adjacent to a lateral surface of the operator's seat.

Recently, an engine has been automatically controlled by an engine control unit, which has low heat resistance, and is therefore arranged in a cooling air suction area inside an engine room; however, the number of sensors for controlling the engine has been increased to increase the unit in size, or a second engine control unit has been required, and therefore it has been difficult to, in a controlling part, ensure an arrangement space for the one or two engine control units and support members for attaching the units.

The present invention is intended to provide a working machine that is adapted to be able to solve such a problem of the conventional technique.

The present invention is intended to provide a working machine that is, by attaching an engine control unit to a support member supporting an operation device between an accessory cover and the operation device to, for multiple purposes, use the support member for attaching the operation device, adapted to be able to arrange the engine control unit in a narrow arrangement space.

Solution to Problem

Specific means adapted to solve the problem in the present invention are as follows.

A first aspect of the present invention is a working machine adapted such that: on a machine base 3 supported by a traveling unit 2, an engine 11 is mounted and a controlling part 6 having an operator's seat 5 is arranged; on one of left and right sides of the controlling part 6, a vehicle accessory 12 is mounted and covered with an accessory cover 15; and on a front side of the operator's seat 5 of the controlling part 6, and near the accessory cover 15, a support member 29 is provided upright to provide an operation device 27, wherein between the accessory cover 15 and the operation device 27, an engine control unit 30 that controls the engine 11 is arranged, and the engine control unit 30 is attached to the support member 29.

A second aspect of the present invention is characterized in that the support member 29 is, in an upper part of a supporting post 29A, provided with: an inner bracket 29B for attaching the operation device 27; and an outer bracket 29C for attaching the engine control unit 30.

A third aspect of the present invention is characterized in that the engine control unit 30 is adapted such that, inside a case cover 30A, a unit main body 30B is attached, and the case cover 30A is attached to the support member 29.

The fourth aspect of the present invention is characterized in that near a lower part of the support member 29 on the machine base 3, a harness guide member 32 is arranged, and the harness guide member 32 is formed with an insertion port 32A for inserting and guiding a harness 31 connected to the engine control unit 30.

A fifth aspect of the present invention is characterized in that the operator's seat 5 is arranged with an air conditioner 20; the operation device 27 has an air duct 25 that is connected to the air conditioner 20 and arranged on a front lateral side of the operator's seat 5, and a meter panel 26 that is provided on an upper back side of the air duct 25; and the air duct 25 is attached to the support member 29.

Advantageous Effects of Invention

According to the present invention, the engine control unit can be arranged in a narrow arrangement space by, for multiple purposes, using the support member for attaching the operation device.

That is, according to the first aspect of the present invention, between the accessory cover 15 and the operation device 27, the engine control unit 30 that controls the engine 11 is arranged, and the engine control unit 30 is attached to the support member 29, so that by using the support member 29 for multiple purposes, the engine control unit 30 can be arranged in a narrow arrangement space between the accessory cover 15 and the operation device 27.

According to the second aspect of the present invention, the support member 29 is, in the upper part of the supporting post 29A, provided with: the inner bracket 29B for attaching the operation device 27; and the outer bracket 29C for attaching the engine control unit 30, and therefore with a simple and inexpensive configuration, the operation device 27 and the engine control unit 30 can be attached.

According to the third aspect of the present invention, the engine control unit 30 is adapted such that, inside the case cover 30A, the unit main body 30B is attached, and the case cover 30A is attached to the support member 29, and therefore a configuration change in the case cover 30A or the unit main body 30B can be handled.

According to the fourth aspect of the present invention, near the lower part of the support member 29 on the machine base 3, the harness guide member 32 is arranged, and the harness guide member 32 is formed with the insertion port 32A for inserting and guiding the harness 31 connected to the engine control unit 30, and therefore the harness 31 connected to the engine control unit 30 can be adequately guided in the controlling part 6.

According to the fifth aspect of the present invention, the air duct 25 that is, on the upper back side thereof, provided with the meter panel 26 can be supported by the support member 29.

DESCRIPTION OF EMBODIMENTS

In the following, an embodiment of the present invention is described on the basis of the drawings.

Figure 1:
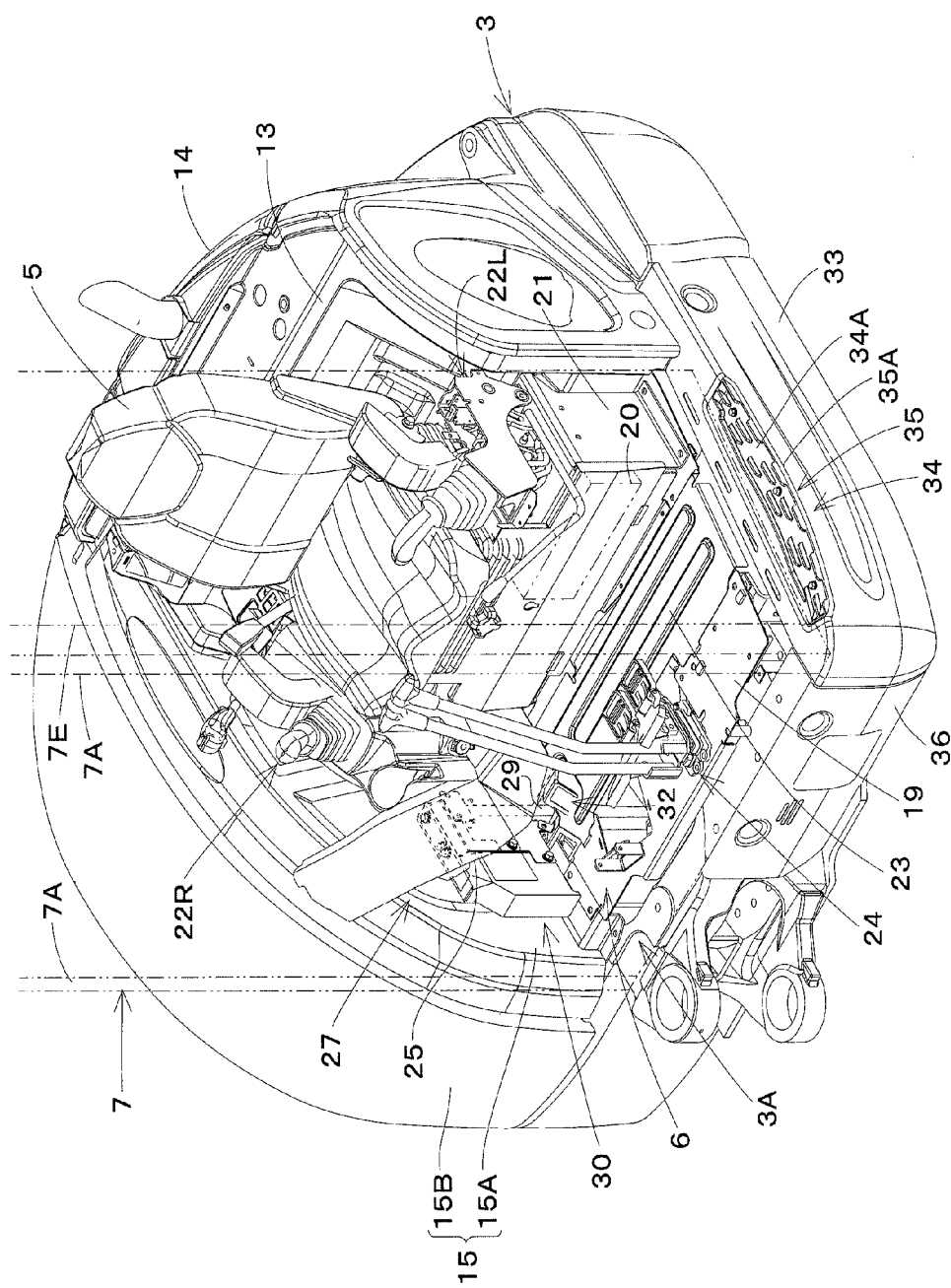
FIG. 1 is a perspective view of a machine base illustrating an embodiment of the present invention.
Figure 2:
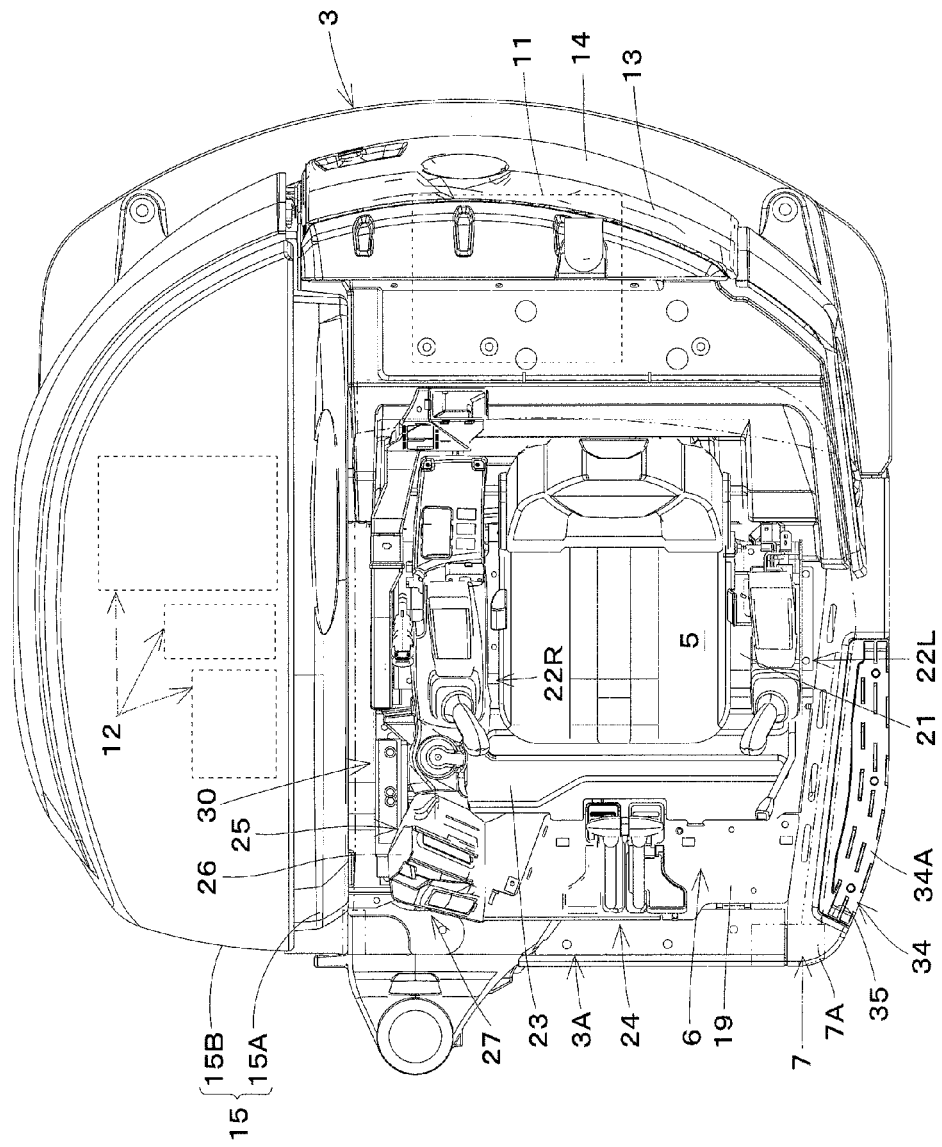
FIG. 2 is a plan view of the machine base.
Figure 3:
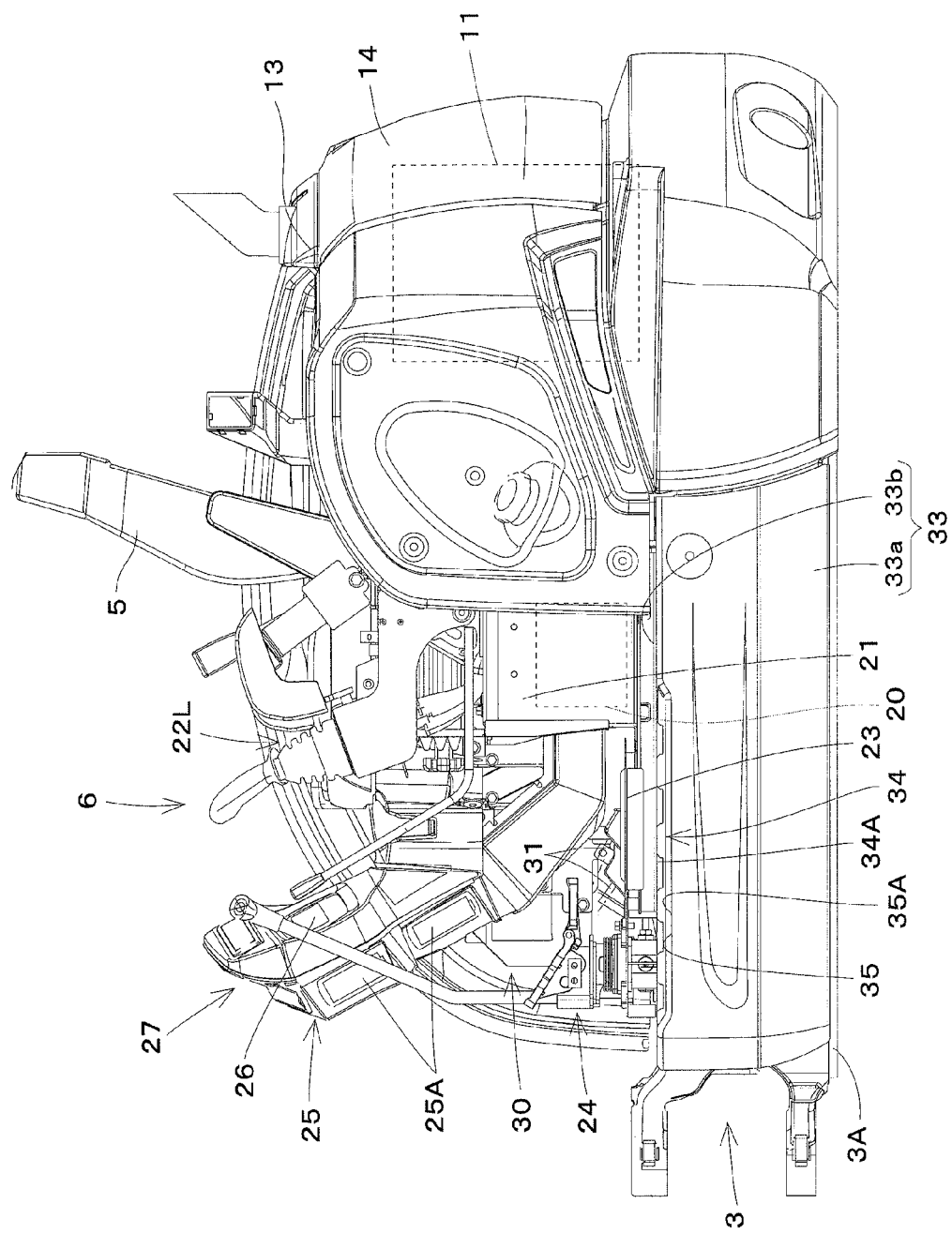
FIG. 3 is a side view of the machine base.
Figure 4:
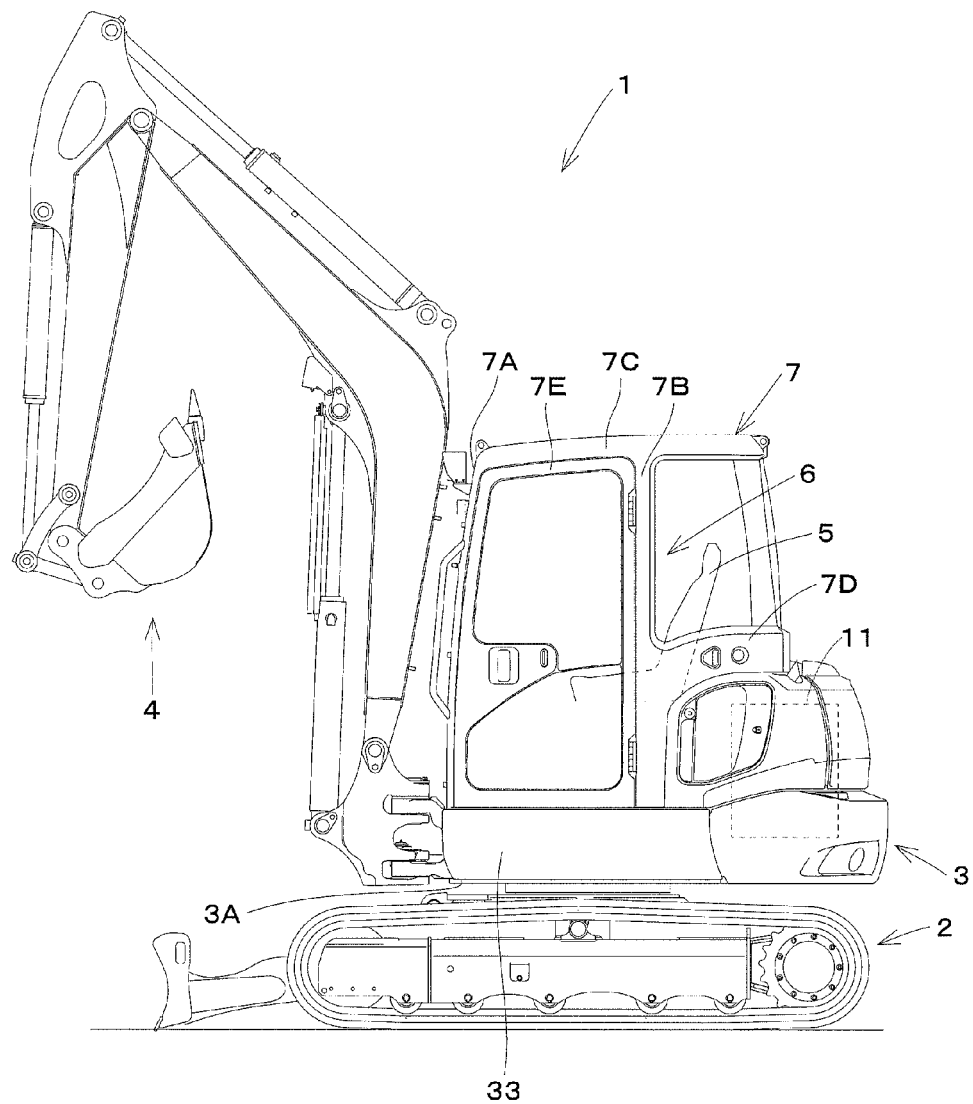
FIG. 4 is an overall side view of a working machine.
Figure 5:
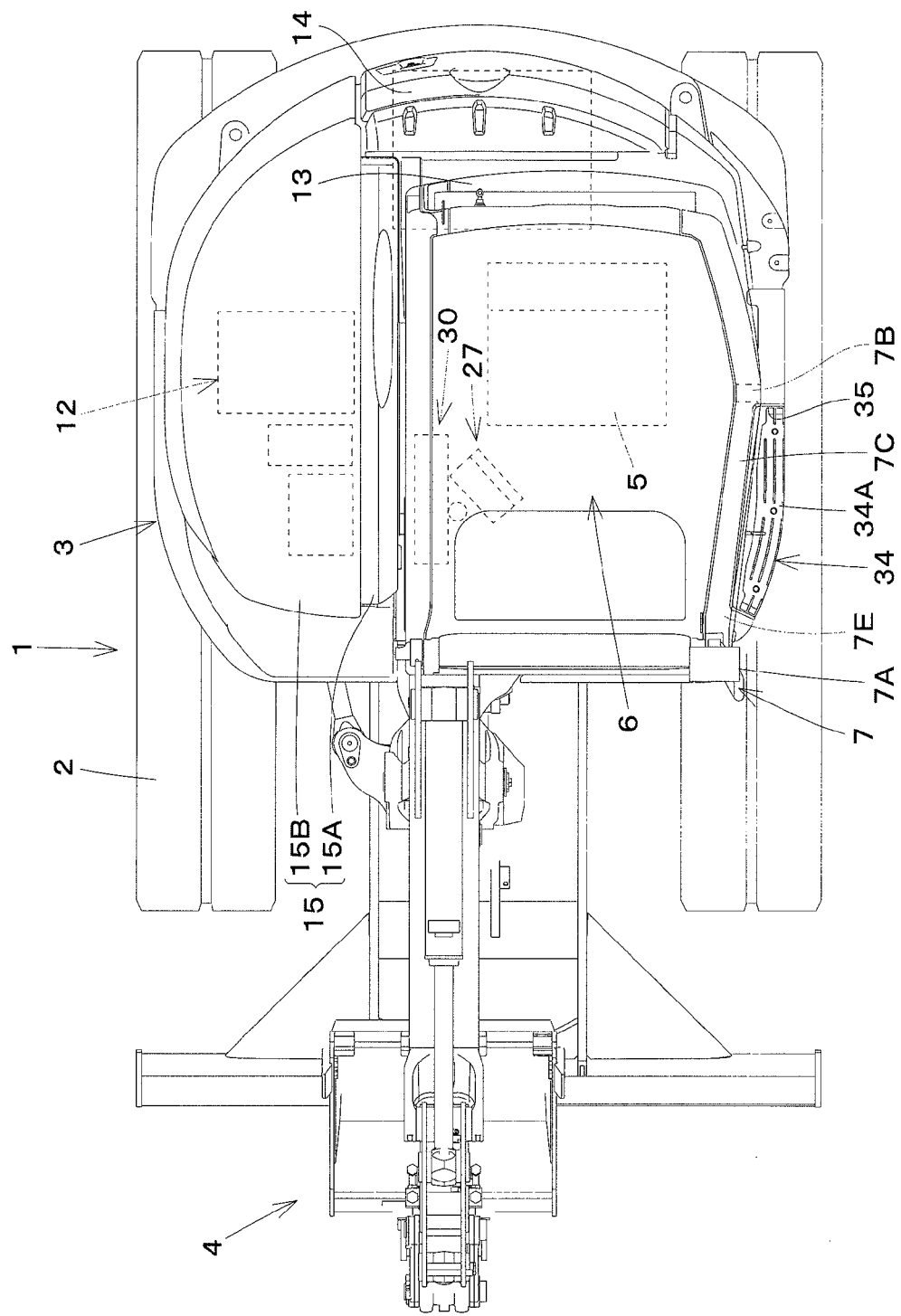
FIG. 5 is an overall plan view of the working machine.

FIGS. 1 to 5 exemplify a reduced tail-swing backhoe as a working machine 1, and in the backhoe 1 is adapted to: on crawler-type traveling units 2, support a machine base (revolving base) 3 that is revolvable around a vertical shaft; have a bucket type excavator unit 4 on a front side of the machine base 3; and on the machine base 3, mount a cabin 7 surrounding a controlling part 6 having an operator's seat 5.

The machine base 3 is adapted to: mount an engine 11 on a back part of a revolving frame 3A; mount vehicle accessories 12 such as an oil tank, a control valve, and a battery on one of left and right sides (on a right side); cover the engine 11 with a fixed engine cover 13 and an openable/closable engine hood 14; and cover the vehicle accessories 12 with an accessory cover 15. The accessory cover 15 has: an accessory side cover 15A that is fixed to a laterally middle part of the revolving frame 3A; and an outer open/close cover 15B that is openable/closable.

The cabin 7 is substantially rectangular shaped in a plan view, mounted on a front part of the revolving frame 3A and on a left side of the accessory cover 15, and provided with: left and right pairs of front supporting posts 7A and side supporting posts 7B; an upper frame 7C that is connected to upper ends of the four supporting posts, i.e., the front and side supporting posts 7A and 7B, and attached with a ceiling member; a lower frame 7D that ranges from lower ends of the front supporting posts 7A to lower ends of the side supporting posts 7B and is connected with the lower ends of the left and right side supporting posts 7B; an open/close door 7E that opens/closes a doorway surrounded by a front supporting post 7A, side supporting post 7B, and frame members such as the upper frame 7C and the lower frame 7D; and the like.

Figure 6:
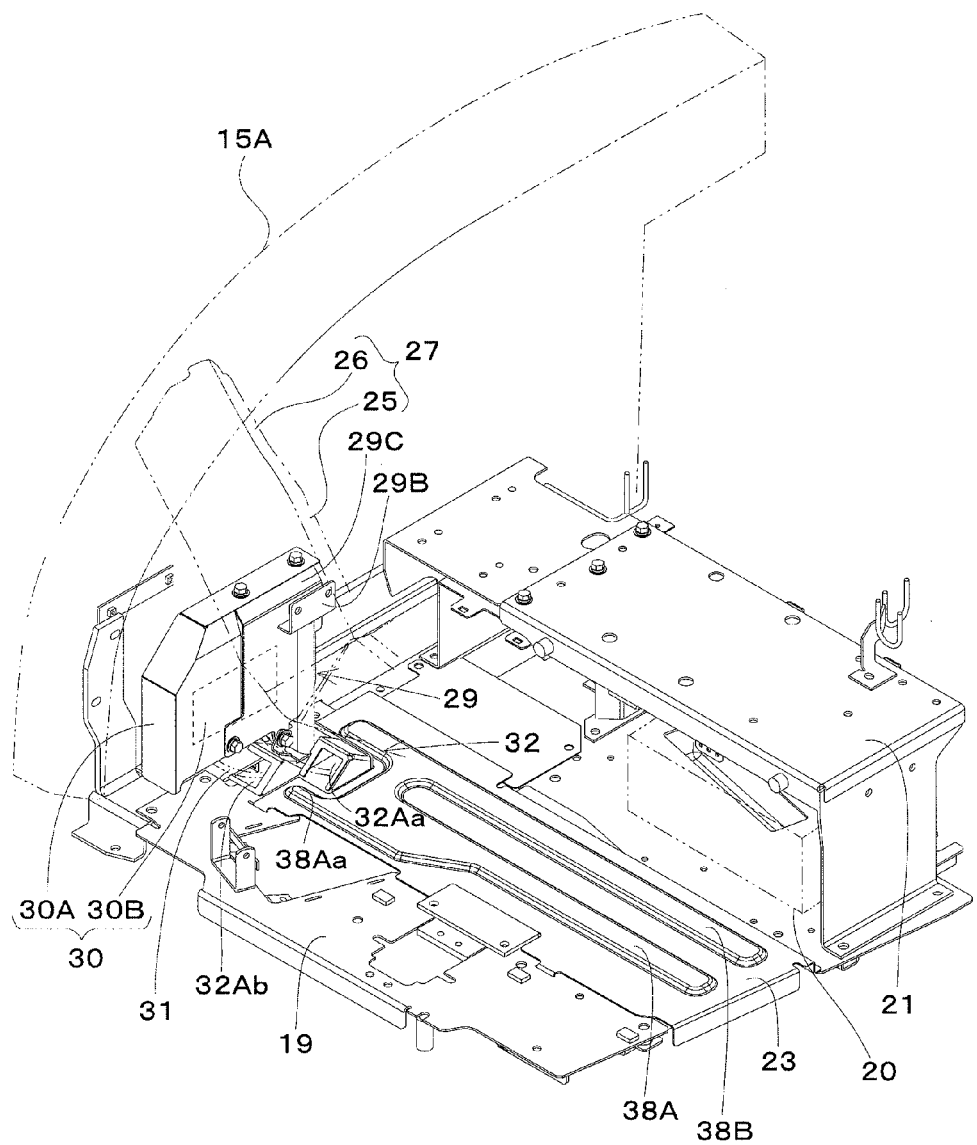
FIG. 6 is a perspective view of upper structure of the machine base.
Figure 7:
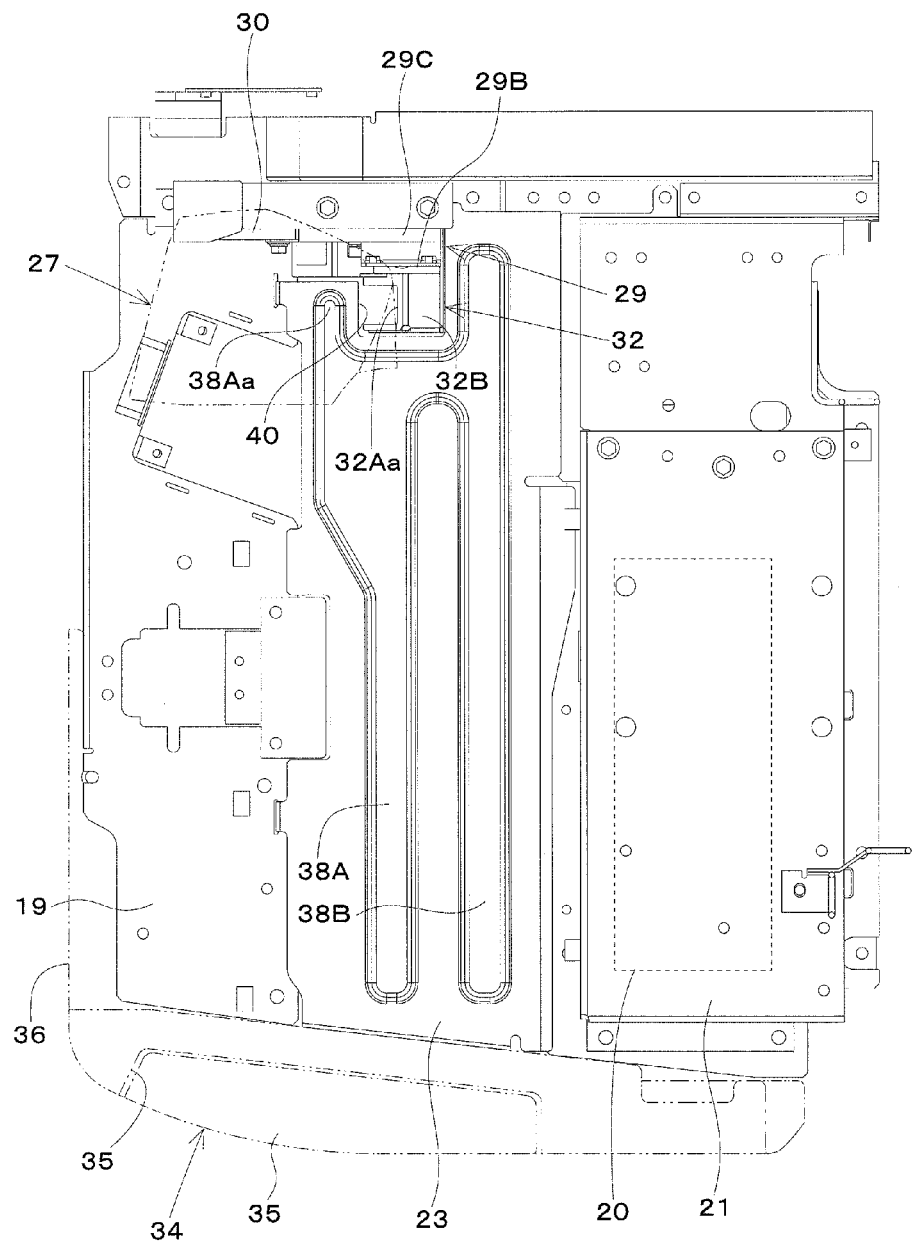
FIG. 7 is a plan view of the upper structure of the machine base.
Figure 8:
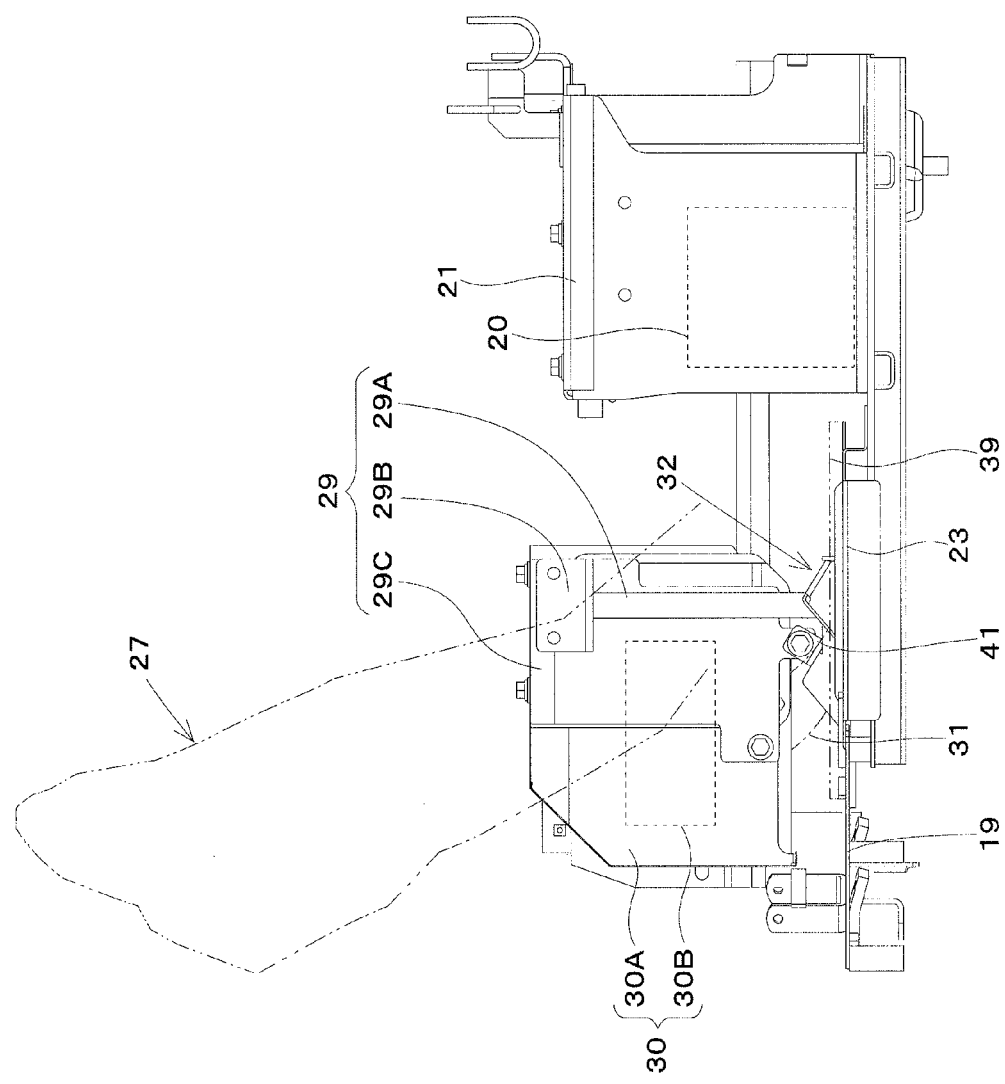
FIG. 8 is a side view of the upper structure of the machine base.
Figure 9:
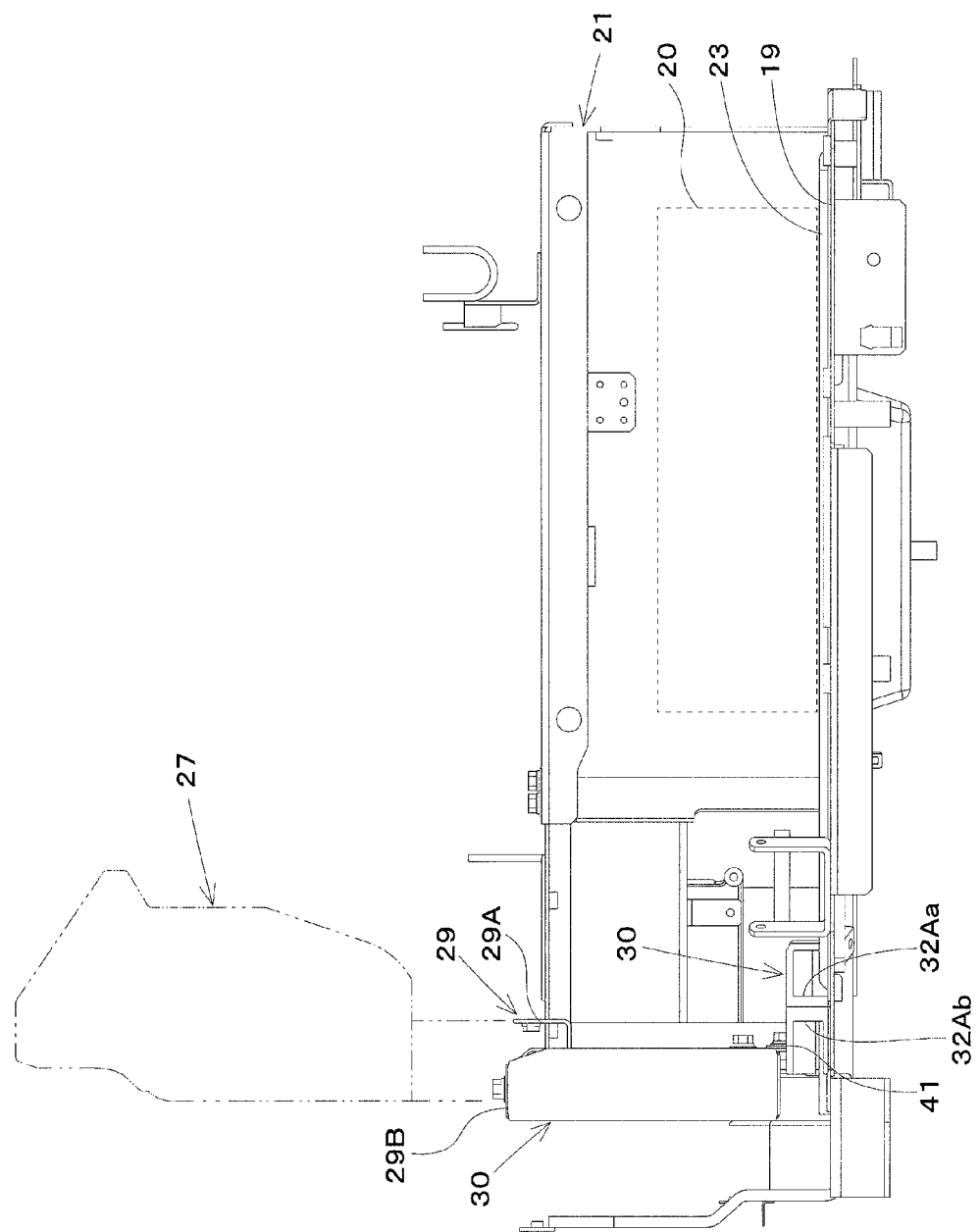
FIG. 9 is a front view of the upper structure of the machine base.

In FIGS. 1 to 3 and 5 to 9, in the controlling part 6 inside the cabin 7, a seat base 21 is fixed to a longitudinal middle part of the revolving frame 3A in front of the engine cover 13; on the seat base 21, the operator's seat 5 is placed; and inside the seat base 21, an air conditioner 20 is contained.

On upper right and left sides of the seat base 21, lever controlling devices 22R and 22L for controlling a boom cylinder and bucket cylinder of the excavator unit 4 and a revolving motor for the machine base 3, and the like are arranged with being distributed right and left across the operator's seat 5.

On an upper surface of the revolving frame 3A in front of the seat base 21, a floor step 23 is detachably provided; in front of the floor step 23, a front floor plate 19 is provided; in such a way as to vertically penetrate through the front floor plate 19, a traveling lever controlling device 24 for controlling hydraulic motors of the traveling units 2, and the like is arranged in the front part of the revolving frame 3A; and also, a traveling accelerator pedal, a swing pedal for operating a swing cylinder of the excavator unit 4, and the like are arranged.

Upward from a right front of the seat base 21, an air duct 25 is protruded; the air duct 25 is communicatively connected to the air conditioner 20; a plurality of air blowing ports 25A for blowing cooling air to a windshield, operator's seat 5, and the like in the cabin 7 is formed; and on a back side of an upper part of the air duct 25, a meter panel 26 is provided. The air duct 25 and the meter panel 26 constitute an operation device 27.

The operation device 27 is positioned in front of the right lever controlling device 22R, i.e., arranged in a posture of rising from below on the right front side of the operator's seat 5, and the meter panel 26 is provided with various types of meter display parts, a maintenance display part, and the like.

The accessory side cover 15A that covers an inner lateral side of the vehicle accessories 12 forms a right side wall of the cabin 7, and between the accessory side cover 15A and the air duct 25 as the operation device 27, an engine control unit (ECU) 30 as an electronic device that controls the engine 11 is arranged.

In a right lateral part of the revolving frame 3A, a support member 29 is provided upright. An upper part of the support member 29 supports the air duct 25 and is attached with the engine control unit 30.

The engine control unit 30 is one that controls the engine 11 by itself, or one that is, with a main engine control unit performing main control of the engine 11 being provided inside the engine cover 13, connected to the main engine control unit to secondarily control the engine 11.

On a right lateral side of the floor step 23, a harness guide member 32 that guides harnesses 31 from the engine control unit 30 to the engine 11 side is provided under the support member 29, and on a left lateral side of the floor step 23, a doorway step (a getting-on/off step) 34 is provided on a left machine base side cover 33 of the machine base 3. A front part of the left machine base side cover 33 is connected to a front cover 36 that covers a left front part of the machine base 3.

Figure 10:
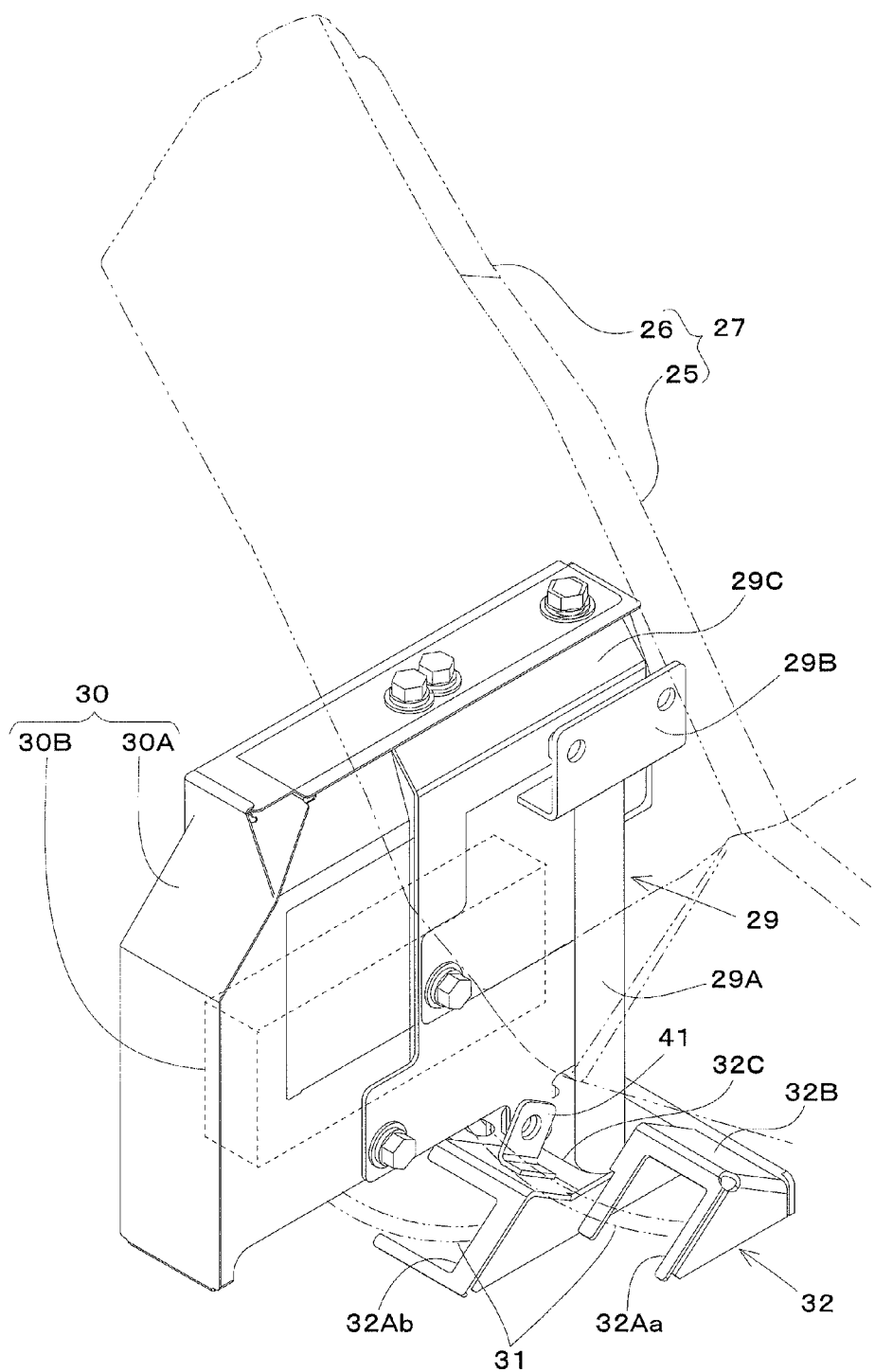
FIG. 10 is a perspective view illustrating electronic device attachment structure.
Figure 11:
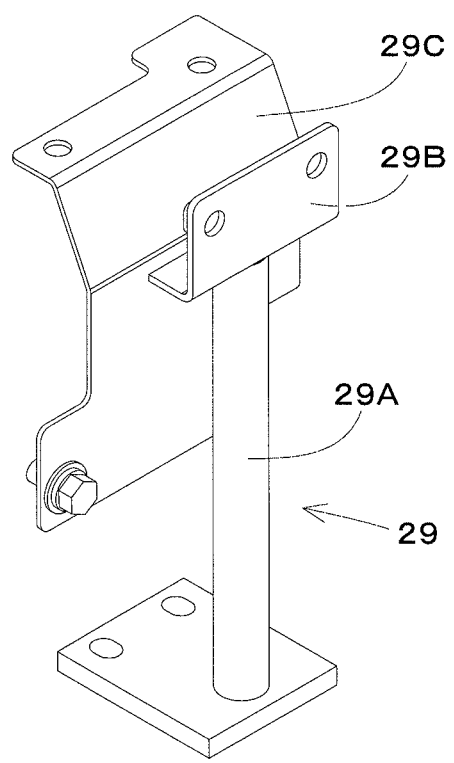
FIG. 11 is a perspective view of a support member as viewed from a front side
Figure 12:
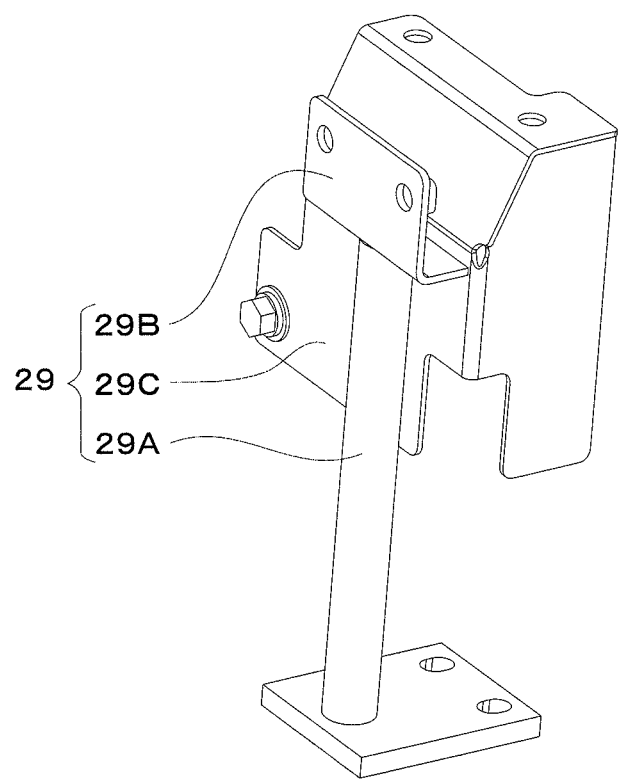
FIG. 12 is a perspective view of the support member as viewed from a back side.

On the basis of FIGS. 1 to 3 and 6 to 12, attachment structure of the engine control unit 30 as an electronic device is described.

The engine control unit 30 is supported by the support member 29 and arranged between the accessory side cover 15A of the accessory cover 15 covering the vehicle accessories (auxiliary devices for vehicle) 12 on a right lateral side of the controlling part 6 and the operation device 27 having the air duct 25 and the meter panel 26.

The support member 29 is, in an upper part of a supporting post 29A made of a round pipe, provided with: an angle-shaped inner bracket 29B for attaching the operation device 27; and a vertically long outer bracket 29C for attaching the engine control unit 30.

The engine control unit 30 is adapted such that, inside a box-shaped case cover 30A, a unit main body 30B as an electronic device main body is attached, and the case cover 30A is held with being suspended at an upper part of the outer bracket 29C through bolts, and also fixed on a lateral surface with bolts.

Attachment surfaces of the inner bracket 29B and outer bracket 29C of the support member 29 are laterally and vertically separated, and the operation device 27 is attached on the operator's seat 5 side, and can be attached/detached to/from the inner bracket 29B even in the presence of the engine control unit 30, whereas the engine control unit 30 is attached on the accessory side cover 15A side, and can be attached/detached to/from the outer bracket 29C even in the presence of the operation device 27.

Near a lower part of the support member 29 on the machine base 3, the harness guide member 32 is arranged, and the harness guide member 32 is provided with a stay 41 attached to a lower part of the outer bracket 29C.

Figure 17:
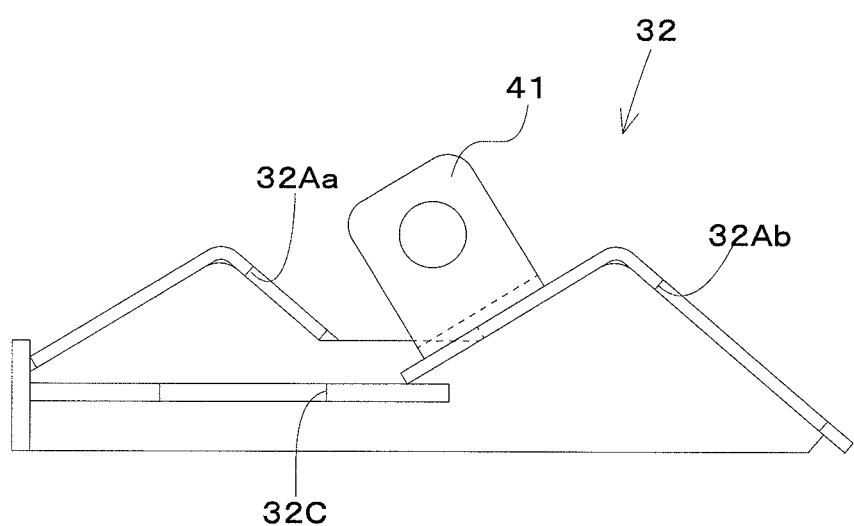
FIG. 17 is a side view of the harness guide.
Figure 18:
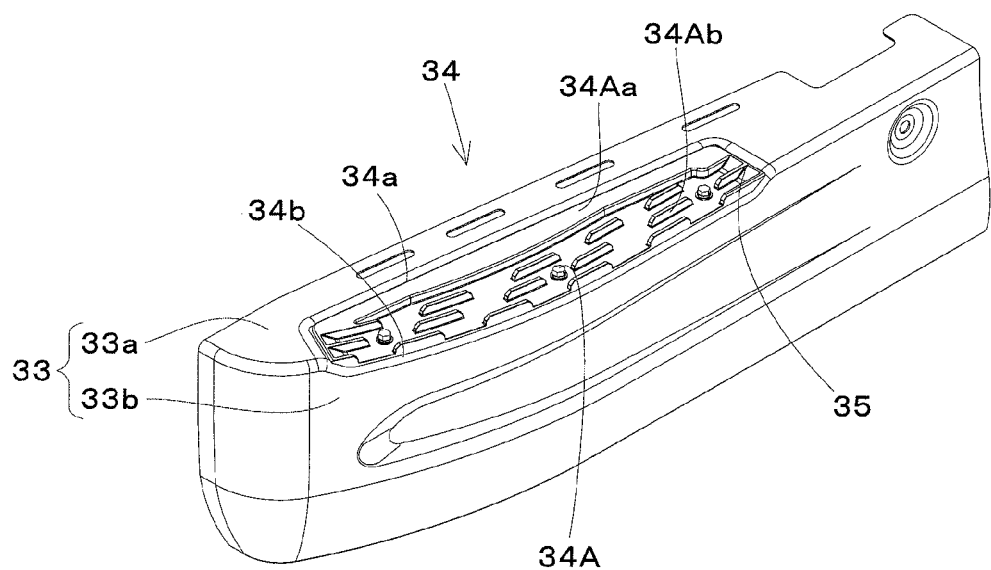
FIG. 18 is a perspective view of a doorway step.

As illustrated in FIGS. 6 to 10, 17, and 18, the harness guide member 32 has: a fitting part 32C that is L-shaped in a plan view, and fits into the supporting post 29A in a middle part; a first insertion port 32Aa that is positioned on a left lateral side of the fitting part 32C; and a second insertion port 32Ab that is positioned on a front lateral side of the fitting part 32C, and is inserted with the harnesses 31 connected to the engine control unit 30 and engine 11 or the main engine control unit to guide the harnesses 31 into the machine base 3.

Surfaces forming the first and second insertion ports 32Aa and 32Ab of the harness guide member 32 are on front sides of chevron surfaces that protrude upward, and aback side tilted surface of the first insertion port 32Aa serves as a footrest surface 32B, whereas a back side tilted surface of the second insertion port 32Ab is provided with the stay 41.

Accordingly, the harness guide member 32 is attached to the lower part of the outer bracket 29C to guide the plurality of harnesses 31 with longitudinally and laterally separating the harnesses 31, and by providing the footrest surface 32B, prevents a foot of an operator from being caught by any of the harnesses 31.

Figure 13:
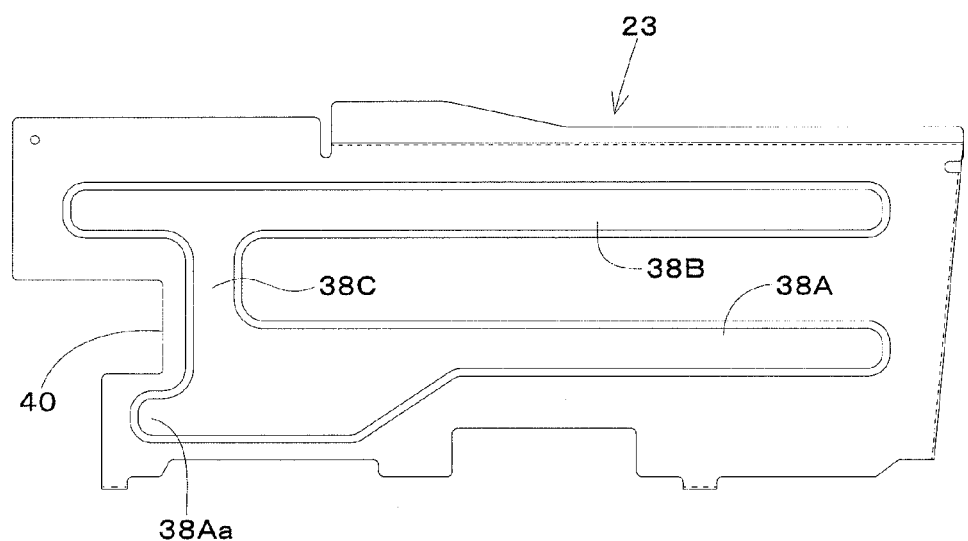
FIG. 13 is a plan view of a floor step.
Figure 14:
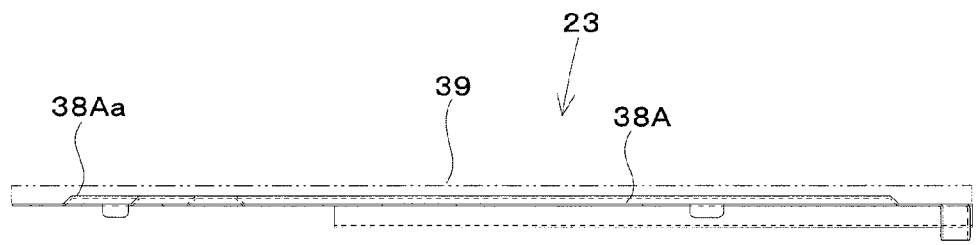
FIG. 14 is a front view of the floor step.
Figure 15:
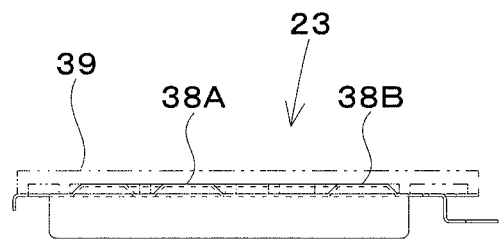
FIG. 15 is a side view of the floor step.

On the basis of FIGS. 1 to 3, 6 to 9, and 13 to 15, the floor step 23 is described in detail.

The floor step 23 is one formed by press punching and drawing processes of a laterally long flat plate, on which a plurality of (two) swelling parts 38 that are laterally long and of an upward protruding shape are longitudinally formed; on one of left and right sides (right side) of the floor step 23 and on a front side of an end part of the back swelling part 38B, an opening part 40 for inserting the harnesses 31 for the engine control unit (electronic device) 30 is provided; and on a laterally middle part side of the opening part 40, a connecting swelling part 38C that connects the back swelling part 38B and the front swelling part 38A to each other is formed.

Above the opening part 40, the harness guide member 32 is arranged. The opening part 40 may be opened to a front end of the floor step 23 to form a swelling shape connecting a right end of the front swelling part 38A and a front end of the connecting swelling part 38C to each other; however, in the present embodiment, an end part 38Aa of the front swelling part 38A is provided with extending to a lateral side of the connecting swelling part 38C and a front side of the opening part 40.

The front swelling part 38A is adapted such that an end part thereof on a side connecting to the connecting swelling part 38C is formed to have a longitudinally wide width as compared with the rest thereof, and thereby the right end part 38Aa of the front swelling part 38A can go into the front side of the opening part 40.

The floor step 23 improves strength thereof by longitudinally forming the plurality of swelling parts 38 and also connecting the back swelling part 38B and the front swelling part 38A through the connecting swelling part 38C, and prevents a reduction in strength of an end part of the floor step 23, which is caused by forming the opening part 40, by making the right end part 38Aa of the front swelling part 38A go into the front side of the opening part 40.

On the floor step 23, a floor mat 39 is laid. The floor mat 39 is, on a lower surface thereof, formed with a rib that fits not only in a circumference of the floor step 23 but also fits between the front and back swelling parts 38A and 38B, and laid over the whole of an upper surface of the floor step 23.

Figure 19:
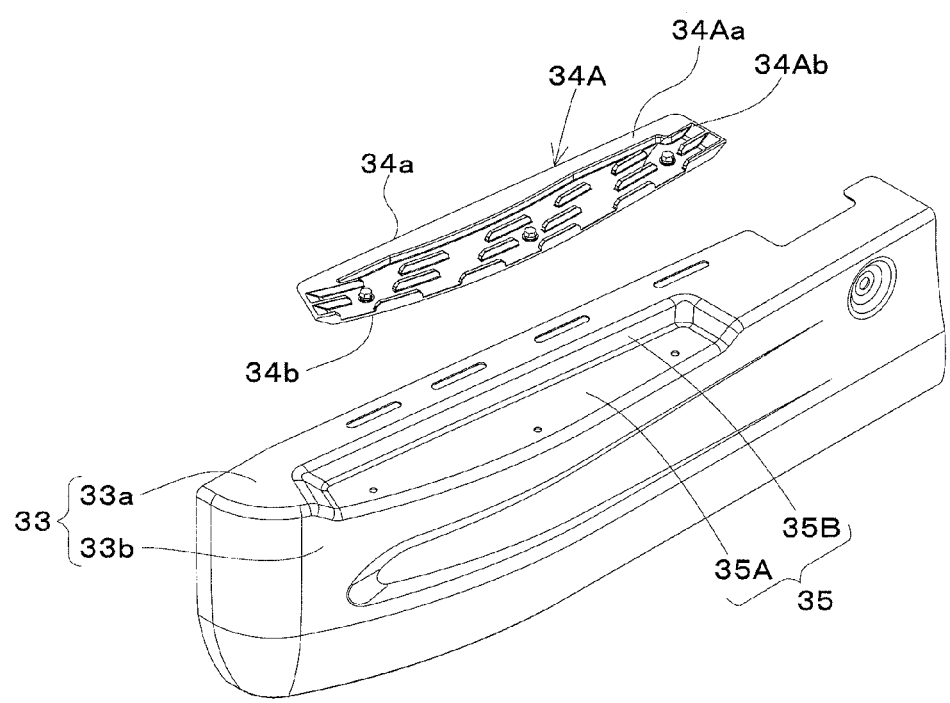
FIG. 19 is an exploded perspective view of the doorway step.
Figure 20:
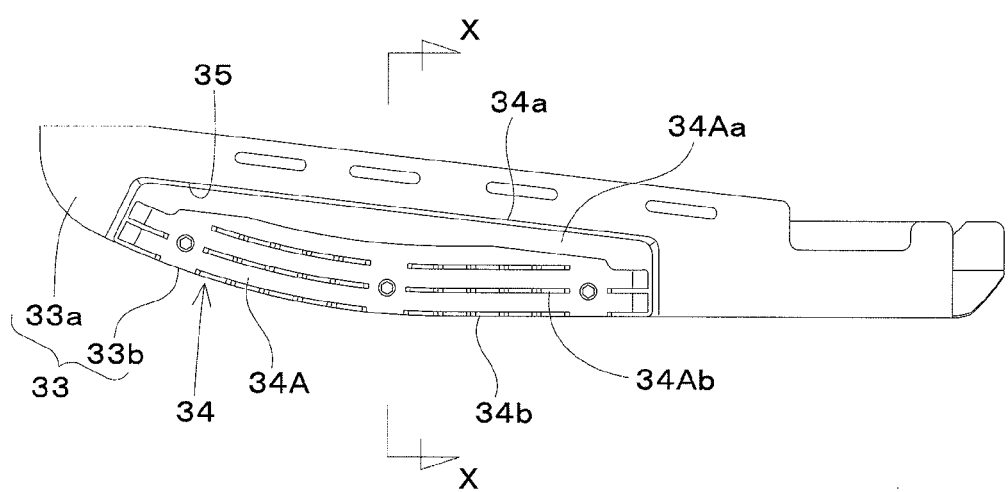
FIG. 20 is a plan view of the doorway step.
Figure 21:
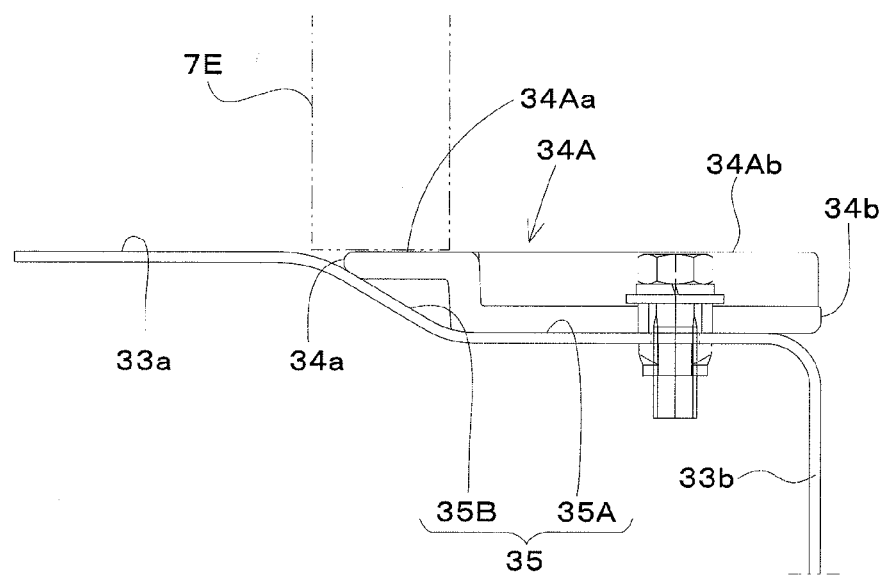
FIG. 21 is a cross-sectional view of the doorway step along an X-X line.

In FIGS. 1 to 3, 5, 7, and 18 to 21, structure of the doorway step 34 is described in detail.

The doorway step 34 is arranged in a position where the lower frame 7D of the cabin 7 and a lower part of the open/close door 7E overlaps with each other; on an upper surface of the left side machine base side cover 33, a concave portion 35 of which a bottom surface 35A is horizontal is formed; in the concave portion 35, a doorway step member 34A is provided; and an outer edge 34b of the doorway step member 34A is of an arc shape that is parallel to a side surface of the left machine base side cover 33, whereas an inner edge 34a is positioned on an inner side of an outer surface of the lower part of the open/close door 7E of the cabin 7 and of a substantially parallel linear shape.

That is, regarding the doorway step 34, on a front lateral surface of the revolving frame 3A, the left machine base side cover 33 is provided; the left machine base side cover 33 has a horizontal upper wall 33a and an arc-shaped side wall 33b; and on the side wall 33b side of the upper wall 33a, the doorway step concave portion 35 is formed.

Regarding the concave portion 35, the bottom surface 35A is formed horizontally and in parallel with an upper surface of the upper wall 33a; a rising tilted surface 35B that rises obliquely upward from a circumference of the bottom surface 35A is formed; and an upper edge of the rising tilted surface 35B is connected to the upper surface of the upper wall 33a.

Part of the upper edge of the rising tilted surface 35B on the floor step 23 side (part of the upper edge of the tilted surface on a longitudinally long depth side) is linear, and formed on an inner side of the outer surface of the lower part of the open/close door 7E and in substantially parallel with the outer surface of the lower part.

The doorway step member 34A is formed of resin, rubber, or the like, and with being inserted into the concave portion 35, attached to the left machine base side cover 33 with fastening members such as bolts.

The doorway step member 34A is of a shape similar to a planar shape of the concave portion 35, and the inner edge 34a on the cabin 7 side is of a linear shape substantially parallel to the upper edge of the rising, tilted surface 35B, and arranged on the inner side than the outer surface of the lower part of the open/close door 7E and in substantially parallel with the outer surface of the lower part.

The outer edge 34b of the doorway step member 34A is formed in the arc shape that is an outward protruding shape parallel to an outer surface of the machine base side cover 33 and an outer edge of the concave portion 35.

The doorway step member 34A is adapted such that, in a lateral width direction thereof, an upper surface from the inner edge 34a to a middle part is a flat surface 34Aa, and an upper surface from the middle part to the outer edge 34b is a nonslip surface 34Ab having unevenness; the outer surface of the lower part of the open/close door 7E at the time of closing is positioned in the middle part of the doorway step member 34A; the flat surface 34Aa from the inner edge 34a to middle part of the doorway step member 34A overlaps with the open/close door 7E; and the nonslip surface 34Ab is positioned on an outer side of the outer surface of the lower part of the open/close door 7E.

Figure 16:
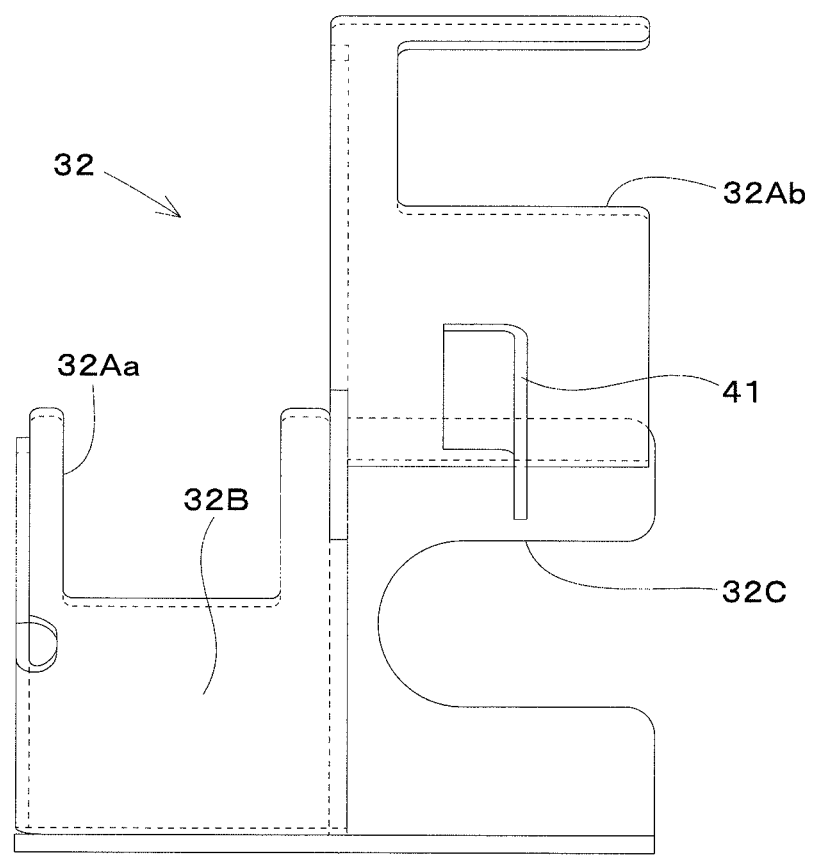
FIG. 16 is a plan view of a harness guide.

Note that in the present invention, it is best to configure shapes of the respective members in the embodiment, and longitudinally, laterally, and vertically positional relationships among the respective members as illustrated in FIGS. 1 to 21. However, without limitation to the embodiment, the members and configurations may be variously modified, and combinations may be changed.

For example, the air duct 25 attached to the support member 29 may be formed with an air blowing port for blowing cooling air toward the engine control unit 30.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

The texts of Japanese application Nos. 2012-174125, 2012-174123, and 2012-174124 filed on Aug. 6, 2012 are hereby incorporated by reference.

The invention claimed is:

1. A working machine comprising:
   a traveling unit;
   a machine base supported by the traveling unit;
   an engine mounted on the machine base;
   a controlling part having an operator's seat;
   a vehicle accessory provided on a side of the controlling part;
   a cover configured to cover the vehicle accessory;
   a support member provided in front of the operator's seat and in a vicinity of the cover;
   an operation device provided to the support member; and
   an engine control unit configured to control the engine, the engine control unit being arranged between the accessory cover and the operation device and being attached to the support member.

2. The working machine according to claim 1, wherein the support member includes:
   a supporting post;
   an inner bracket provided to an upper portion of the supporting post, the inner bracket being configured to attach the operation device; and
   an outer bracket provided to the upper portion of the supporting post, the outer bracket being configured to attach the engine control unit.

3. The working machine according to claim 1, wherein the engine control unit includes:
   a case cover; and
   a unit main body attached inside the case cover,
   wherein the case cover is attached to the support member.

4. The working machine according to claim 1, further comprising:
   a harness guide member arranged in a vicinity of a lower portion of the support member; and
   a harness connected to the engine control unit,
   wherein the harness guide member is provided with an insertion port for inserting and guiding the harness.

5. The working machine according to claim 1, further comprising an air conditioner arranged to the operator's seat,
   wherein the operation device includes:
      an air duct connected to the air conditioner and arranged on a front lateral side of the operator's seat; and
      a meter panel provided to a back surface of an upper portion of the air duct,
      wherein the air duct is attached to the support member.

6. The working machine according to claim 1, further comprising:
   an excavator unit;
   an air conditioner arranged under the operator's seat;
   a floor step arranged in front of a lower side of the operator's seat;
   a traveling lever controlling device arranged on a front portion of the floor step, the travelling lever controlling device being configured to control the travelling unit;
   a right lever controlling device arranged on a right lateral side of the operator's seat, the right lever controlling device being configured to control the excavator unit; and
   a left lever controlling device arranged on a left lateral side of the operator's seat, the left lever controlling device being configured to control the excavator unit,
   wherein the machine base is supported on the traveling unit to be revolvable around a vertical shaft,
   wherein the excavator unit is mounted on a front portion of the machine base,
   wherein the engine is mounted on a back portion of the machine base,
   wherein the operator's seat is arranged in front of the engine,
   wherein the vehicle accessory is mounted on a right lateral side of the operator's seat, air conditioner, and floor step, the vehicle accessory including an oil tank, and
   wherein the operation device is arranged on a right lateral portion of the floor step, the operation device including a meter panel.

7. The working machine according to claim 1, further comprising a floor step arranged in front of a lower side of the operator's seat, the floor step being longitudinally formed,
   wherein a plurality of swelling parts laterally long are longitudinally formed on the floor step,
   wherein an opening part is provided on one of left and right sides of the floor step and on a front side of an end part of a back swelling part of the plurality of swelling parts, the back swelling part positioning backward in the plurality of swelling parts, and
   wherein a connecting swelling part connects between the back swelling part and a front swelling part of the plurality of swelling parts to each other, the front swelling part positioning forward in the plurality of swelling parts, the connecting swelling part being formed on a side of a laterally middle part than the opening part.

8. The working machine according to claim 7, wherein an end part of the front swelling part is provided to be extended to a lateral side of the connecting swelling part and a front side of the opening part.

9. The working machine according to claim 7, further comprising:
   a harness connected to the engine control unit; and
   a harness guide member protruding upward and being of a chevron shape, the harness guide member being provided to the opening part of the floor step,
   wherein the harness is inserted into the opening part,
   wherein an insertion port is formed on a front side tilted surface of the chevron shape of the harness guide member, the front side tilted surface being formed on a front of the harness guide, the insertion port being configured to insert the harness, and
   wherein a footrest surface is formed on a back side tilted surface of the chevron shape of the harness guide member, the back side tilted surface being formed on a back of the harness guide.

10. The working machine according to claim 1, further comprising:
    a floor step arranged in front of a lower side of the operator's seat, the floor step being longitudinally formed; and
    a machine base side cover provided on a doorway side of the floor step and on an outer lateral part of the machine base,
    wherein the machine base is supported on the traveling unit to be revolvable around a vertical shaft,
    wherein a doorway step concave portion is formed on an upper wall of the machine base side cover,
    wherein a doorway step member is provided in the concave portion, and
    wherein a bottom surface of the concave portion is formed to be a horizontal surface and is connected to an upper surface of the machine base side cover from a circumference of the bottom surface through a rising tilted surface.

11. The working machine according to claim 10, further comprising:
    a cabin configured to surround the operator's seat, the cabin being mounted on the machine base; and
    an open/close door arranged in a position of overlapping with the machine base side cover and on a lateral side of the cabin,
    wherein an upper edge of the rising tilted surface of the concave portion on a floor step side, and an inner edge of the doorway step member are arranged on an inner side of an outer surface of a lower part of the open/close door to be substantially parallel with the outer surface of the lower part.

12. The working machine according to claim 11, wherein the outer surface of the lower part of the open/close door, the upper edge of the rising tilted surface of the concave portion, and the inner edge of the doorway step member are substantially linearly formed, and
    wherein an outer surface of the machine base side cover and the outer edge of the doorway step member are each formed in an outward protruding arc shape.

* * * * *